Figure 8:
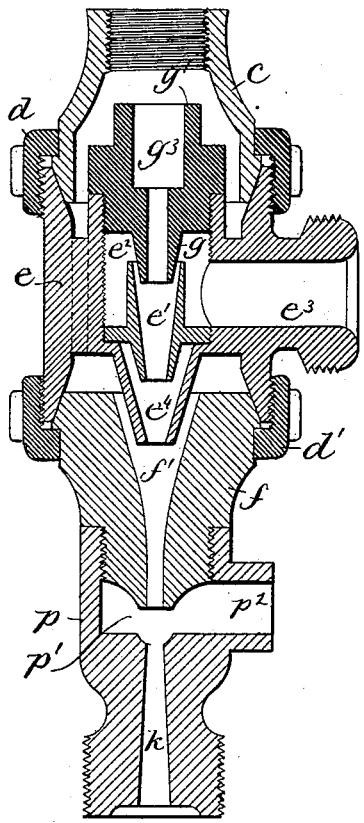

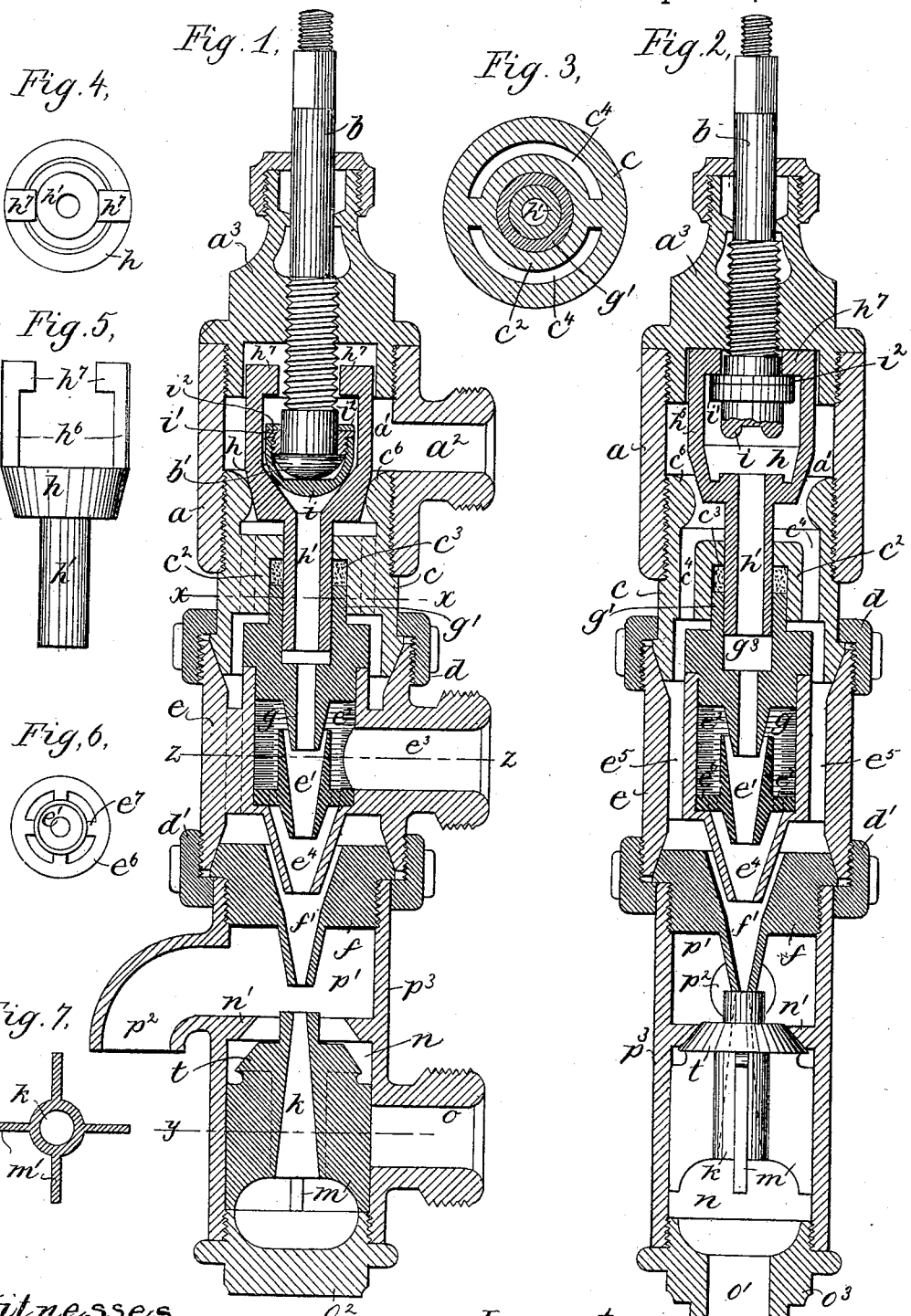

(Model.)

W. T. MESSINGER.
INJECTOR.

No. 390,031. Patented Sept. 25, 1888.

Witnesses
Jas. J. Maloney
M. E. Hill

Inventor,
William T. Messinger,
by Jos. P. Livermore
Att'y.

UNITED STATES PATENT OFFICE.

WILLIAM T. MESSINGER, OF CAMBRIDGE, MASSACHUSETTS.

INJECTOR.

SPECIFICATION forming part of Letters Patent No. 390,031, dated September 25, 1888.

Application filed August 8, 1887. Serial No. 246,378. (Model.)

*To all whom it may concern:*

Be it known that I, WILLIAM T. MESSINGER, of Cambridge, county of Middlesex, State of Massachusetts, have invented an Improvement in Injectors, of which the following description, in connection with the accompanying drawings, is a specification, like letters on the drawings representing like parts.

The object of my invention, relating to injectors, is to produce an injector that will operate with greater certainty than injectors heretofore made, under widely-varying steam-pressures, without change or adjustment of the relative position of the tubes or nozzles or area of the orifices thereof, and also to provide novel means for quickly establishing the combined jet in the delivery-pipe by affording an escape or relief passage for the steam and air until the water is raised and combines with the steam, and then automatically cutting off the said escape or relief passage at the moment that the combined jet acquires sufficient pressure to enter the boiler or other point of delivery.

While steam and water will be spoken of, respectively, as the "actuating-fluid" and "liquid to be forced," it is obvious that the apparatus is applicable to other fluids and liquids, and the invention is not limited to any especial use to which the injector may be put.

The portion of the invention relating to the relief-passage that facilitates the lifting of the water and forming the combined jet and the means for automatically closing the said passage as soon as the jet is formed is applicable to injectors of various construction, and this part of the invention is not limited, therefore, to any particular construction of the injector proper.

Letters Patent No. 281,385, granted to me July 17, 1883, and Nos. 302,272 and 302,273, granted to me July 22, 1884, and Nos. 350,545, 350,546, and 350,547, granted to me October 12, 1886, show and describe injectors having three concentric tubes or nozzles, the first of which enters and closes the rear or base of the second, which enters the rear or base of the third, the bases of the first and third of which communicate with a supply of steam, and the second of which is provided with a lateral opening, which communicates with a supply of water, and the said patents illustrate various different appliances for controlling the admission of steam to the injector in such manner that it is supplied to the first tube or nozzle slightly before it is supplied to the third tube or nozzle. In the first action of the injectors thus constructed a jet of steam is discharged from the first tube or nozzle directly through the discharge-passages of both the second and third tubes or nozzles, and escapes freely through the overflow-opening of the injector, thereby producing a vacuum in the base or rear end of the second tube or nozzle, which is expanded to admit of the entrance of water at its lateral opening and around the discharge-orifice of the first tube or nozzle and the jet of steam as it issues therefrom, which is thereby condensed at that point and imparts its velocity to the water, so that a current of water is thus established flowing through the discharge-passages of the second and third tubes or nozzles. A second supply of steam, being then admitted at the base of the third tube or nozzle, is in turn condensed by the water and imparts to the current the required impetus or force.

As will be clear to all familiar with the operation of jet apparatus, the more rapid and free the escape of the initial jet of steam through the discharge-passage of the water tube or nozzle the greater will be the vacuum produced in the base of the water tube or nozzle, and in my first construction of the injector, as shown in Letters Patent No. 281,385, the discharge-orifice of the first tube or nozzle was extended as far as possible into and as near as possible to the discharge-orifice of the water tube or nozzle, thus producing in operation nearly a perfect vacuum in the water tube or nozzle and lifting the water a great height; but in practice I have found that when the initial steam-jet is discharged in such close proximity to the discharge-orifice of the water tube or nozzle, after having performed its function of lifting the water, the steam-jet will not sufficiently condense and combine with the water before entering the next tube or nozzle. This difficulty may be obviated by elongating the discharge-passage of the water tube or nozzle backward within the tube or nozzle itself and shortening correspondingly the discharge-passage of the first tube or nozzle, so as to retain an adequate water-passage in the base of the water tube or nozzle, and also lengthen its discharge-passage without increasing its external dimensions, and this construction is shown in Letters Patent Nos. 350,545, 350,546, and 350,547; but I have found that the increased length of the discharge-passage of the water tube or nozzle considerably impedes the flow of the water through it, so that in operation at high pressure of steam the water is not supplied rapidly enough to balance and properly condense the second supply of steam admitted at the base of the final tube or nozzle, and therefore substantially the same difficulty results in the operation of the injector in both the forms of construction shown in said patents. I have found by experiment that I am able to overcome these difficulties and to attain the advantages and avoid the defects of both the previous forms referred to by a novel construction which forms the subject of the present invention, so far as relates to the injector proper, and which consists in the employment of an additional tube or nozzle introduced between and in line with the discharge-passages of the first and second tubes or nozzles and inclosed wholly within the second tube or nozzle of the said former constructions.

In referring to my present invention I shall designate this additional tube or nozzle as the "second" tube or nozzle of the injector, the second tube or nozzle of former constructions becoming the third, and the third tube or nozzle of former constructions becoming the fourth tube or nozzle of the present improved injector. The improved injector thus consists of four tubes or nozzles in line, the first delivering directly into the rear or base of the second, the second delivering directly into the rear or base of the third, the third delivering directly into the rear or base of the fourth, and the bases of the first and fourth communicate with a supply of steam or actuating-fluid, while the bases of the second and third communicate with a supply of water or other fluid to be forced.

Any suitable means may be provided for controlling the admission of actuating-fluid to the rearmost and foremost tubes or nozzles, which might, if desired, receive fluid from different sources, the rearmost, for instance, taking steam at a high pressure, while the foremost is supplied with steam at a lower pressure, or with exhaust-steam. I have shown, however, the foremost tube or nozzle as taking steam from the same source as the rearmost tube or nozzle, the foremost tube or nozzle communicating with a steam-chamber at the rear of the rearmost tube or nozzle by passages formed in a case or shell around the intermediate water tubes or nozzles; and any of the devices illustrated in the patents before referred to may be employed for controlling the admission of steam from the said steam-chamber to the rearmost and foremost tubes or nozzles, although I have shown a slightly-modified construction of these devices.

The appliances forming the other part of my invention are located beyond the discharge-orifice of the foremost nozzle or combining-tube of the injector proper, and may be placed in the same position to and co-operate in substantially the same manner with the combining-tube or discharge-nozzle of any injector, and consist, essentially, in a chamber surrounding the discharge-orifice of the combining-tube and communicating with the external atmosphere, like the usual overflow-chamber of an injector, and a discharge-chamber separated from the said overflow-chamber by a partition containing a passage and valve-seat, and a discharge-tube and valve in the said discharge-chamber, which discharge-tube and valve are movable toward and from the discharge-orifice of the combining-tube, and are so arranged that when the valve is seated the mouth of the discharge-tube also comes to a seat at the end of the combining-tube and forms practically a continuation thereof, and when in this position the interior of the injector and its discharge-passages are wholly cut off from communication with the overflow-chamber or relief-passage, which was, however, in communication with the injector and discharge-chamber up to the time that the combined jet was formed and began to be discharged from the combining-tube or discharge-nozzle of the injector proper.

Figure 9:
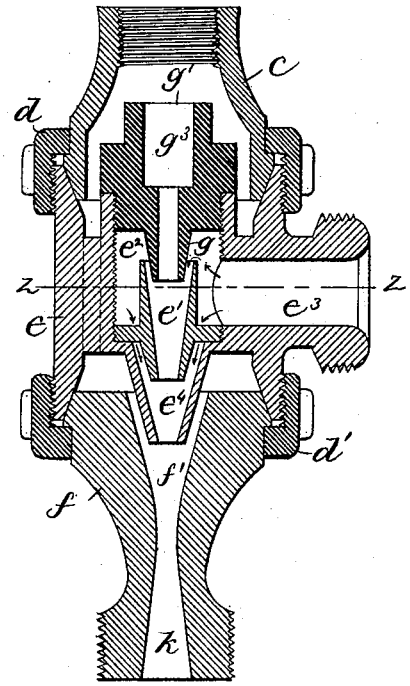
Figure 11:
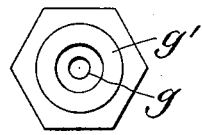
Figure 10:
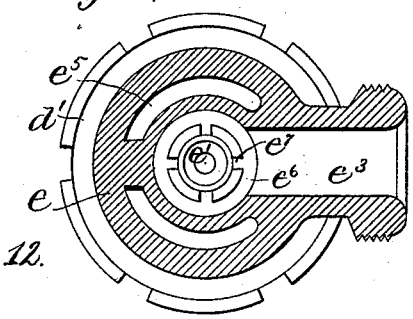

Figure 1 is a longitudinal vertical section of an injector embodying this invention, showing the apparatus with the discharge-chamber and relief-passage or overflow-chamber, and with appliances for controlling the admission of steam to the injector proper, the parts being shown in the position assumed when the actuating-fluid is cut off from the injector and it is not in operation. Fig. 2 is a longitudinal section on a plane at right angles to that of Fig. 1, showing the parts in the position assumed when the injector is in operation; Fig. 3, a transverse section on line X X; Figs. 4 and 5, a plan view and side elevation, respectively, of a portion of the valve or device controlling the admission of steam to the injector; Fig. 6, a plan view of the second tube or nozzle detached; Fig. 7, a transverse section of the movable discharge tube; Fig. 8, a longitudinal section similar to that of Fig. 1, showing only the injector proper and an overflow-chamber of ordinary construction between the orifice of the combining-tube and mouth of the discharge-tube; Fig. 9, a similar section showing the injector without any overflow-chamber, the discharge-tube being a continuation of the combining-tube; Fig. 10, a transverse section on line Z Z; Fig. 11, a plan view of the first tube or nozzle detached; and Fig. 12, a sectional diagram of a construction not forming part of this invention, being shown for the purpose of comparison with the novel construction forming the subject of this invention.

In general construction and method of putting the parts together the injector proper closely resembles those shown in the Letters Patent hereinbefore referred to.

The injector proper independent of the other parts is best shown in Fig. 9, and comprises a casting, $e$, containing the water tube or nozzle $e^2$, having a water-inlet passage, $e^3$, and water-discharge passage $e^4$. The piece or casting $e$ is threaded at either end, and is connected at one end by a coupling, $d$, with a connecting-piece, $c$, through which the steam passes to the injector from the boiler, the said piece $c$ being shown in Figs. 8 and 9 as provided with internal threads, by which it may be connected with the steam-supplying pipe, provided with a suitable valve or device for controlling the passage of steam through it. The other end of the piece or casting $e$ is connected by a coupling, $d'$, with a piece, $f$, in which is formed the fourth or foremost tube or nozzle, $f'$, which, as shown in Fig. 9, is extended to form a suitable discharge-tube, $k$, through which the combined jet is discharged. The water tube or nozzle $e^2$ is internally threaded, as shown, and has screwed into it the first or rearmost tube or nozzle, $g$, substantially as in the patents hereinbefore referred to, in which, however, the tube or nozzle $g$ was shown as delivering directly into the discharge-passage $e^4$, formed at the other end of the water tube or nozzle $e^2$.

Figure 12:
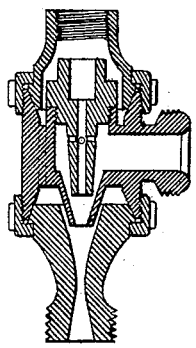

One part of the present invention consists in the addition to the parts just described as existing in the previous patents of an intermediate tube or nozzle, $e'$, between the discharge-passage of the first tube or nozzle, $g$, and the discharge-passage $e^4$ of the water tube or nozzle $e^2$, the said tube or nozzle $e'$ being shown as provided with a ring, $e^6$, connected by spokes or arms $e^7$ (see Fig. 6) with the said tube or nozzle, the said ring being threaded or screwed into the tube or nozzle $e^2$, and being screwed down firmly upon a shoulder at the base of the discharge-passage $e^4$. The space between the ring $e^6$ and the tube or nozzle $e'$ affords a passage around the tube or nozzle $e'$ into the discharge-passage $e^4$, and the addition of the intermediate tube or nozzle, $e'$, between the discharge orifice of the first tube or nozzle, $g$, and the discharge-passage $e^4$ of the main water tube or nozzle $e^2$ is found to greatly improve the operation of the injector, especially at high pressure of steam. The initial steam-jet, being discharged from the first tube or nozzle, $g$, directly through the tube or nozzle $e'$, is maintained without expansion to a point in close proximity to the discharge-orifice $e^4$ of the water tube or nozzle $e^2$; but as soon as the water is thereby lifted into the water tube or nozzle $e^2$ a portion of the water will be drawn in at the base of the tube or nozzle $e'$ sufficient to condense the steam-jet at that point, so that the main body of water entering the discharge-passage $e^4$ around the tube or nozzle $e'$ will not then come in contact with a jet of steam, but will instead be met by a current of water issuing from the tube or nozzle $e'$. Thus in operation, when steam is admitted to the injector, the initial steam-jet is maintained to the desired proximity to the discharge-orifice of the water tube or nozzle, thereby producing the requisite vacuum; but as soon as the water is properly lifted to the injector the terminus of the initial steam-jet is automatically transferred to the base of the second or intermediate tube or nozzle, while the water, nevertheless, can still flow without impediment into and through the discharge-passage of the main water tube or nozzle. The results achieved by this construction might be partially produced by extending the discharge-passage of the first tube or nozzle and making in it a number of lateral holes or openings, as illustrated in Fig. 12; but, as reference to my previous patents will demonstrate, in all injectors invented by me the employment of lateral holes or openings in any of the tubes or nozzles at right angles to the bore or run is scrupulously avoided; for although tubes or nozzles containing such lateral holes or openings may give partially satisfactory results under the most favorable conditions of steam and water, yet the slightest irregularity in either will cause the jet to spatter and pass out through the holes, and result in a "break" in the working of the injector.

In order to produce strong and reliable operation under varying conditions, every tube or nozzle of the injector must consist throughout its discharge-passage of a smooth and unbroken bore, discharging directly into the base of the tube or nozzle next in advance of it, and the base of each tube or nozzle having an enlargement or mouth of proper area and taper, so that the fluid enters in the direction of the jet passing through instead of transversely to the said jet, and thus insures the catching back of any spatter caused by momentary irregularity in the jet.

It is obvious that, if desired, the tubes or nozzles $f'$ and $g$ may be supplied with steam from separate sources, and that steam may be conveyed to the base of the tube or nozzle $f'$ by any desired form of pipe or passage; but, as shown in this instance, the casting or shell $e$, that contains the water tube or nozzle, is provided with ports or passages $e^5$, (see Figs. 2 and 10,) through which steam entering through the piece $c$ arrives at the base of the foremost tube or nozzle, $f'$. When the steam is thus drawn from the same source for both the tubes or nozzles $f'$ and $g$, its admission to the said tubes or nozzles is preferably controlled by a valve or device such as shown in any of the patents hereinbefore referred to; or, if steam is to be taken from different sources, a device such as represented in Patent No. 302,272 is applicable to the present form of injector.

The device which I have herein shown is most like that shown in Letters Patent No.

350,545, dated October 12, 1886, from which it differs only in particulars hereinafter mentioned. As shown in Figs. 1 and 2, the connecting-piece $c$, through which the steam passes to the injector, is connected with a casting, $a$, forming a portion of the steam-chamber $a'$, which casting $a$ is provided with a steam-inlet passage, $a^2$, and bonnet $a^3$, that constitutes a nut for the stem $b$, by which the valves that control the admission of fluid to the tubes or nozzles $f'$ and $g$ are operated.

The casting or connecting-piece $c$ is tightly fastened to the piece $a$ by screw-threads or otherwise, the two connected pieces $a$ and $c$ constituting the steam-chamber, and being made separately merely for the purpose of applying the coupling-nut $d$; and, if desired, the said connecting-piece and the various passages, seats, and so forth, formed therein might be made integral with the piece $a$, being attached to the piece $e$ by a screw-thread, bolted flange, or other suitable means, instead of employing the coupling-nut.

The first or rearmost tube or nozzle, $g$, is provided with a tubular extension, $g'$, fitted within a suitably-recessed portion, $c^2$, in the connecting piece or portion $c$ of the steam-chamber, the said extension $g'$ and portion $c^2$ forming a passage, $g^3$, into which is fitted a tubular extension, $h'$, of the secondary valve $h$, which is free to move up and down in the said passage $g^3$. The tubular extension $g'$ does not wholly fill the recess of the portion $c^2$, leaving a space therein to receive packing $c^3$, which may be placed around the tubular extension $h'$ before the steam-chamber is connected with the piece $e$ by the coupling-nut $d$, and when the said pieces are drawn together by the said coupling-nut the packing will be compressed tightly within said recess around the extension $h'$, thus causing the latter to be steam-tight in the passage $g^3$.

The portion $c$ of the steam-chamber is provided with passages $c^4$ (shown in Figs. 2 and 3) around the recessed portion, and above the said passages it has a seat, $c^5$, preferably convex, as shown, which co-operates with the main body of the secondary valve $h$, so that the latter, when seated as shown in Fig. 1, prevents the passage of steam from the inlet $a^2$ to the passages $c^4$, which communicate through the space around the first tube or nozzle with the passage $e^5$ in the piece $e$, leading to the fourth tube or nozzle. The secondary valve $h$ is made hollow, steam being admitted to the interior thereof, and at the upper end of the tubular extension it has a seat for the main valve $i$, connected or made integral with the valve-stem $b$. When the main valve $i$ is unseated, steam will immediately pass through the passage $h'$ to the first tube or nozzle, and the said main valve $i$ or the valve-stem $b$ is provided with an annular shoulder or projection, $i'$, which, after a definite amount of movement of the said main valve from its seat, engages the secondary valve and lifts it from its seat $c^5$, as shown in Fig. 2, permitting steam to pass through the passages $c^4$ and $e^5$ to the fourth tube or nozzle, $f'$.

The main valve $i$, with its engaging-shoulder for supporting the secondary valve, is preferably constructed as shown in Fig. 1, consisting of a cup-shaped piece that engages a seat in the secondary valve $h$, and receives within it a head or projection, $b'$, on the valve-stem $b$, which has a comparatively small surface in contact with the inner part of the valve $i$, so that as the said valve engages the seat the end of the stem $b$ in turning will slip on the inner surface of the said valve, instead of causing the valve itself to turn or slip on the seat.

The cup-shaped valve $i$ is held on the stem, so as to be raised by the head $b'$ thereof, by means of an annular nut, which forms the shoulder $i'$, for lifting the valve $h$, and which is preferably screwed into the valve $i$ with a thread of opposite inclination to that of the stem $b$, so that when the latter bears against the nut in raising the valve it will tend to screw the nut more tightly into place.

The mode of operation of these devices for controlling the admission of steam to the injector and the advantage of their construction are substantially the same as that of the corresponding devices in Patent No. 350,545, dated October 12, 1886.

The novelty of the present construction consists in the means by which the main valve engages the secondary valve, which are as follows: The secondary valve is provided with two arms, $h^6$, terminating in inwardly-projecting fingers $h^7$, which receive the stem $b$ between them and extend sufficiently far inward to be engaged by the shoulder $i'$ of the main valve $i$, as shown in Fig. 2.

If desired, the valve $i$ and shoulder or collar may be made integral with the stem $b$, as shown in Fig. 2, this construction answering well for injectors of small size; but the construction represented in Fig. 1 is preferable, especially in larger-sized injectors, where the area of the passages controlled by the valves is considerable.

As the valve $h$ may be held to its seat with considerable pressure, the fingers $h^7$ will bear somewhat forcibly on the said shoulder $i'$, and as the said projections do not extend wholly around the stem, as will be seen from Fig. 4, when the valve $i$ and its shoulder or collar are made integral with the stem $b$, they might catch on the shoulder and cut into it, or might cause the valve $h$ to turn bodily with the stem $b$; and to obviate this a ring or washer, $i^2$, is placed loosely around the stem $b$ above the shoulder $i'$, which shoulder will thus turn readily on the ring when the latter bears against the fingers $h^7$.

The ring or washer is preferably employed in either construction, as it answers the further purpose of determining the amount of movement of the valve $i$ from its seat before engaging and lifting the secondary valve.

The main valve and its collar $i'$ may be engaged with the lifting-arms and fingers $h^6$ $h^7$ of the secondary valve in putting the device together before the bonnet $a^3$ is screwed into place, and then when the tubular extension $h'$ of the secondary valve is inserted in its passage and the bonnet $a^3$ is screwed into place the main valve will be retained in proper position to co-operate with the secondary valve to open and close the same.

The injector proper ends with the fourth tube or nozzle $f'$, which may be connected with the delivery-pipe in any usual manner or stand in any usual relation to the same. In the simplest form (shown in Fig. 9) the injector, terminating in a casting, $f$, containing the continuous combining and discharge tube $f'k$, may be connected with one branch of an ordinary T fitting, another branch of which leads to the boiler or point where the liquid is to be delivered, and the third branch of which leads into the air, and is provided with a suitable stop-cock, which is left open in starting the injector to afford a relief-passage, through which the air in the pipes and the steam escape until the water is raised and the combined jet formed, after which the operator has to close the stop-cock, and the stream will then have to continue through the delivery-pipe into the boiler. When operated on this plan, considerable water is wasted between the time when it first appears at the relief-passage and before the operator can get the stop-cock closed. The injector may also have the usual overflow-chamber, as shown in Fig. 8, in which a casting, $p$, containing an overflow-chamber, $p'$, around the orifice of the combining-tube $f'$ and mouth of a discharge-tube, $k$, communicates with the air through an open relief-passage, $p^2$. This operates in the usual manner to permit the escape of air and steam through the space between the orifice of the combining-tube and mouth of the discharge-tube until the combined jet is formed, when it passes directly across this space; and in this construction, when the relief-passage $p^2$ remains open, the jet will draw in air and dust and deliver it with the water into the boiler, which necessitates the use of a valve or cock in the relief-passage $p^2$, to be closed after the injector is started.

Another more serious objection to the ordinary construction of the overflow-chamber and discharge-tube (represented in Fig. 8) is that the discharge-tube $k$ and passage between it and the usual check-valve, through which the liquid passes to the boiler, frequently become filled with air while the injector is not at work, and when in starting the injector the jet begins to form and issues from the combining-tube it blocks the mouth of the discharge-tube, $k$, so that the air cannot readily escape from said discharge-tube, but forms an elastic cushion that resists the entrance of the stream into the discharge-tube, forcing said stream back and out from the overflow-chamber at the passage $p^2$, and thus making it very difficult to start the proper operation of the injector, and causing delay and much waste of water.

The objections to these usual modes of construction and operation are obviated by the attachment shown in Figs. 1 and 2, consisting, essentially, of a casting, $p^3$, containing an overflow-chamber, $p'$, having an outlet-passage, $p^2$, and surrounding the orifice of the combining-tube $f'$, like the usual overflow-chamber shown in Fig. 8. The discharge-tube $k$ is movable toward and from the combining-tube $f'$, and is preferably capable of seating directly on the end of the combining-tube, as shown in Fig. 2, so as to cut off communication between the relief-passage $p^2$ and the inside of the combining-tube and discharge-tube. The said discharge-tube is provided with guides $m'$, (see Fig. 7,) working in a discharge-chamber, $n$, adjacent to the overflow-chamber $p'$ and separated therefrom by a partition, $n'$, having an opening that connects the said chambers, but is controlled by a valve, $t$, connected with and shown as made integral with the discharge-tube $k$, and arranged to seat and close the opening in the partition $n'$ when the discharge-tube is seated on the end of the combining-tube, as shown in Fig. 2, thus cutting off communication between the discharge-chamber $n$ and the relief-passage $p^2$ at the same time that the combining and discharge tubes are cut off from communication with the said passage between the orifice of the former and mouth of the latter.

In operation, when steam is first admitted to the injector and before the water is raised by it, the discharge-tube $k$ and valve $t$ will be in the position shown in Fig. 1, thus permitting the free escape of steam around the orifice of the combining-tube, while at the same time a portion of the steam will continue by its velocity through the discharge-tube $k$ into the chamber $n$, expelling the air from the said discharge-tube and chamber through the openings in the partition $n'$ into the overflow-chamber $p'$, from which it readily escapes through the relief-passage $p^2$. Consequently the moment the combined jet is formed it will meet no opposition in entering the discharge-tube $k$, and will pass into the chamber $n$, producing a great pressure in the said chamber that is unbalanced by the slight pressure in the overflow-chamber $p'$, and consequently forces the valve $t$ and discharge-tube $k$ to their respective seats, as represented in Fig. 2, so that the discharge-tube now forms practically a continuation of the combining-tube, just as represented in Fig. 9, and the interior of the injector and the discharge-chamber $n$ are wholly cut off from communication with the interior of the overflow-chamber and relief-passage to the external air.

The valve $t$, operating as described, in connection with the discharge and overflow chambers, is valuable even if the discharge-tube $k$ is not arranged to seat on the end of the combining-tube $f'$, as it will prevent any opposition to the combined stream entering the discharge-tube, although it is preferable to have the discharge tube and valve arranged as shown, so as to cut off communication from the overflow-chamber wholly, and thus prevent foreign material from entering while the injector is in operation, and avoid the necessity for any valve or cock in the passage $p^2$.

The liquid may be discharged from the chamber $n$ either through an opening, $o$, in its side, suitably arranged for pipe connection, in which case the end of the chamber $n$ will be closed by a cap or plug, $o^2$, as represented in Fig. 1; or the outlet from the said chamber may be, as shown at $o'$ in Fig. 2, in a piece screwed into the end of the chamber $n$, which then has its lateral outlet closed, or contains no such outlet. In this construction the piece $o^3$, containing the outlet-passage $o'$, forms the end of the chamber $n$ and confines the discharge-tube and valve therein.

It is obvious that the parts last described—namely, the overflow-chamber and the discharge-chamber beyond and the movable discharge tube and valve—may be applied beyond the combining-tube or discharge-nozzle of an injector of any usual construction, operating, as described, to facilitate the starting of the injector.

Any suitable means may be employed for connecting the parts together and with the water, steam, and delivery pipes, ordinary screw-threads or coupling-nuts having been shown as a simple and convenient means of accomplishing this.

The relative size, shape, and taper of the tubes or nozzles can be greatly varied without departing from the invention; and the injector may be employed for feeding boilers or elevating and injecting or ejecting fluids, or for any purpose for which such instruments may be applied.

I claim—

1. An injector comprising four tubes or nozzles in line with one another, the first delivering directly into the rear or base of the second, the second delivering directly into the rear or base of the third, and the third delivering directly into the rear or base of the fourth, and the bases of the first and fourth or the rearmost and the foremost tubes or nozzles communicating with a supply of actuating-fluid, and the base of the third tube or nozzle communicating directly with the inlet for the fluid to be forced and constituting the nozzle for receiving the main supply of fluid to be forced, and the second tube or nozzle communicating at its base with the inlet for the fluid to be forced, substantially as described.

2. An injector comprising the four tubes or nozzles in line, the base of the first communicating with the inlet for actuating-fluid, the base of the third communicating directly with the inlet for the fluid to be forced and constituting the nozzle for receiving the main supply of fluid to be forced, and the second tube or nozzle also communicating with the inlet for the fluid to be forced, the injector being provided with a passage around the intermediate tubes or nozzles to the base or mouth of the foremost tube or nozzle, substantially as described.

3. In an injector, the four tubes or nozzles in line with one another, the base of the third tube or nozzle communicating directly with the inlet for the fluid to be forced and constituting the nozzle for receiving the main supply of fluid to be forced, and the second tube or nozzle also communicating with the inlet for the fluid to be forced, and a steam-chamber and passages connecting the same with the bases of the rearmost and foremost of said tubes or nozzles, combined with a steam-inlet-controlling device controlling the admission of steam to the rearmost and foremost tubes or nozzles, substantially as described.

4. In an injector, the four tubes or nozzles in line with one another, and steam-chamber and passages connecting the same with the bases of the rearmost and foremost of said tubes or nozzles, combined with a steam-inlet-controlling device comprising main and secondary valves, the former governing the admission of steam to the rearmost tube or nozzle and the latter governing that to the foremost tube or nozzle, the main valve engaging the secondary valve and opening the same after the main valve itself has been opened, substantially as described.

5. An injector composed of four tubes or nozzles and having a steam-chamber at the rear of the rearmost tube or nozzle, and passages from said steam-chamber to the foremost tube or nozzle, the first or rearmost tube or nozzle and steam-chamber having a continuous passage, combined with a main and a secondary valve, the said secondary valve co-operating with a seat to control the passage of steam to the foremost tube or nozzle, and having a tubular extension working in the passage to the rearmost tube or nozzle, and the main valve controlling the flow of steam through the said tubular extension, and the said main valve or its actuating-stem being arranged to engage and operate the secondary valve, substantially as described.

6. In an injector, the four concentric tubes or nozzles, the first of which enters and closes the rear or base of the third, which enters the base of the fourth, and which incloses the second and is provided with a lateral inlet-passage, combined with a casing or shell connected with the base of the fourth tube or nozzle and inclosing the other three, the space between the said casing and third tube or nozzle forming the inlet-passage for the fourth tube or nozzle and communicating with the first tube or nozzle, whereby an inlet-pipe connected with the said casing affords a common supply for the first and fourth tubes or nozzles, substantially as described.

7. The combination, with an injector, of an overflow-chamber and adjacent discharge-chamber and partition between said chambers, provided with an opening and valve-seat, combined with the connected discharge-tube and valve operated by the pressure of the liquid in the discharge-chamber and seating simultaneously the discharge-tube on the combining-tube and the valve on its seat, whereby the interior of the injector and discharge-chamber are automatically cut off from the overflow-chamber and external atmosphere when pressure is produced in the discharge chamber, substantially as described.

8. The combination, in an injector, of an overflow-chamber and adjacent discharge-chamber and partition between said chambers, provided with an opening and valve-seat, combined with a discharge-tube and a valve operated by the pressure of the liquid in the discharge-chamber to cut off communication between the discharge-chamber and overflow-chamber, substantially as described.

In testimony whereof I have signed my name to this specification in the presence of two subscribing witnesses.

WM. T. MESSINGER.

Witnesses:
  JOS. P. LIVERMORE,
  JAS. J. MALONEY.